Patented Nov. 6, 1951

2,573,750

UNITED STATES PATENT OFFICE 2,573,750

CRYSTALLIZED FRUIT SPREAD AND PROCESS FOR MAKING SAME

Jonathan W. White, Jr., Willow Grove, Pa., assignor to the United States of America as represented by the Secretary of Agriculture No Drawing. Application February 28, 1950,
Serial No. 146,913

17 Claims. (Cl. 99—102)

(Granted under the act of March 3, 1883, as amended April 30, 1928; 370 O. G. 757)

This application is made under the act of March 3, 1883, as amended by the act of April 30, 1928, and the invention herein described if patented in any country, may be manufactured and used by or for the Government of the United States of America for governmental purposes throughout the world without the payment to me of any royalty thereon.

This invention relates to food products and more particularly to nonfluid fruit-sugar compositions, the consistency of which is not dependent upon the presence of pectic substances but is solely the result of a finely granular structure produced by controlled crystallization of the sugar constituents.

The consistency of conventional fruit-sugar compositions utilized as confection and spreads, such as jams, jellies, fruit butters and marmalades depends upon the gelling action of pectin, which in the presence of proper proportions of sugars and acids imparts the necessary degree of firmness to the final product.

This invention has among its objects the provision of methods for producing fruit-sugar compositions having the desirable smooth, non-sticky consistency independently of the presence therein of pectin or gel forming pectin derivatives, as well as of products obtainable thereby, having a flavor similar to that of the original fruit material, which are self-sterile, that is, not subject to spoilage by yeasts, molds or other microorganisms, and possessing a higher sugar content and food value than fruit-sugar compositions, the consistency of which is controlled by the gelling action of pectin.

According to the general method of this invention the fruit material containing a liquid constituent of the original fruit including at least a portion of the sugars and flavor ingredients, is mixed, preferably following depectinization, with an aqueous sugar solution consisting essentially of an invert sugar sirup, that is, a sirup the major portion of the sugars content of which consists of dextrose in admixture with at least an equal weight of fructose. The resulting mixture is concentrated by evaporation to a solids content of about 80–86 percent, and crystals of dextrose hydrate are then incorporated into the concentrated mixture at a temperature not substantially in excess of 100° F. after which the thus treated mixture is maintained at a temperature below 100° F. for a length of time sufficient to allow crystallization of such a portion of the dextrose content thereof as dextrose hydrate as to convert the whole mixture into a finely crystalline product of essentially uniform, non-fluid consistency.

The fruit component of the compositions of this invention may be one or more of the following materials: fruit juice; fruit puree, fruit juice concentrate, with or without the volatile flavoring constituents. Each of these materials may be depectinized if necessary. The sugar component must be levulose-containing and may consist of invert sugar, natural, mild-flavored honey, or of refined honey sugars. The refined honey sugars, the use of which is preferred, consist of the product obtained when a natural honey, which may be normally of undesirably strong flavor, is treated by suitable means, such as by activated carbon or other adsorbent agents, to remove the undesirable strong flavor, to yield a product of composition similar to honey but possessing no characteristic flavor other than mild acidity and sweetness.

Fruit puree may be produced in the usual manner by comminution of whole fruit or portions thereof, and removal of seeds. For best results this fruit puree should be depectinized; although this step is not essential to the process, it facilitates subsequent handling of the concentrated product. Depectinization may be brought about by any conventional means such as by treatment with a suitable pectin-destroying enzyme. If a fruit juice or a fruit juice concentrate is used as the fruit component, it is desirable although not essential that the fruit juice utilized or the juice from which the concentrate is made be depectinized. If a "full flavor" concentrate is employed, that is a fruit juice concentrate having reincorporated therein the volatile flavoring components ordinarily lost during the concentration of the juice, it is preferable that the volatile fraction be added to the fruit-sugar composition immediately prior to the final crystallization step.

In combining the fruit and sugar components, the relative proportions of these ingredients are not critical. The ratio of fruit or fruit juice to sugar solids may vary from a minimum sufficient to impart to the finished product a pronounced fruit flavor, to as much as 1 to 1 or more. However, in order to obtain most desirable flavor characteristics, a mixture of about 40–50 parts by weight of fruit or fruit juice and an amount of sugar component corresponding to 60–50 parts of sugar solids, is usually required. If a fruit juice concentrate is employed, an amount of this concentrate is added which, when the degree of concentration is considered, will be about equivalent to the above-stated amount of original fruit juice.

The mixture of fruit and sugar components is then concentrated by evaporation to a total moisture content in the range of 14-20 percent, and preferably of about 14-18 percent, based on the total weight of the composition. A means best adapted for concentrating the mixture is evaporation under a reduced pressure; in which case the temperature may be kept relatively low, for example at about 60° to 160° F. with beneficial effects on the retention of flavor in the final product. If a volatile fruit flavor concentrate is to be added to the concentrated mixture prior to the crystallization step, the evaporation process is continued until the solids content of the resulting product is such that addition of the corresponding amount of flavor concentrate will not dilute the final product to a moisture content in excess of that stated above. If the fruit juice concentrate is of sufficient low moisture content, evaporation of the sugar component alone to a sufficient degree of moisture, and combination of the two components without further evaporation, may yield a product having a solids content within the limits specified.

It is preferred that the sugar component be already at a high density when the fruit component is added. However, the fruit component can be added directly to the relatively diluted aqueous solution of honey solids obtained after the treatment of honey with activated carbon, or other agents utilized in the production of refined honey sugars. Usually it is more advantageous to utilize a sugar component concentrated to a moisture content of about 14-20 percent before the addition of fruit component, so that exposure of the latter to heat and vacuum in the course of the subsequent concentration of the mixture is reduced to a minimum.

The fruit-sugar mixture after being concentrated to a moisture content of 14-20 percent is cooled to a temperature below about 100° F., and combined with a crystallization starter material. This starter material may be crystalline dextrose hydrate or a material containing this substance, such as a portion of the sugar component which has previously been treated to cause fine crystallization of dextrose hydrate. The amount of starter material may vary from about 2 to at least 50 percent by weight of the concentrated mixture, but satisfactory results are obtained on using about 5-10 percent. The fruit-sugar mixture having the crystallization starter incorporated therein is maintained under conditions which will cause a relatively rapid fine-grained crystallization of a sufficient portion of the dextrose content thereof as dextrose hydrate, to yield a homogeneously granular, nonfluid product. The desired result can be attained by allowing the crystallization to take place at ordinary room temperature, but the process is more rapid and results in finer crystals and a smoother consistency if it is conducted at a temperature of about 55-60° F. In this temperature range the crystallization is substantially completed within a period of about 3 to 6 days.

As illustrative embodiments of a manner in which this invention may be carried out in practice, the following examples are given wherein all parts are by weight.

*Example I*

As sugar component a buckwheat honey was used which had been deflavored by heating with activated carbon (using lime to control the pH) and reconstituted to 81.8 percent solids. To 145 parts of this material was added 150 parts of commercial bottled grape juice (18.5° Brix). The solids content of the homogeneous mixture so obtained was found by refractometer to be 49.0 percent. The mixture was evaporated under approximately 29½ inch vacuum at about 90° to 140° F. to 83° Brix, as measured by a refractometer, cooled to 95° F., and combined with 8 percent by weight of a finely-crystallized starter. This starter had been prepared by addition of about 10 percent of fine-ground dextrose hydrate to a portion of the deflavored buckwheat honey product and allowing the mixture to crystallize at a reduced temperature. The 8 percent added starter was thoroughly mixed in and the product placed in a closed container and kept at 58°±1.5° F., for 7 days. At the end of this time the product consisted of a firm, smooth deep-ruby purple solid composition with an excellent grape odor and flavor.

*Example II*

Commercially frozen red raspberries were defrosted, pureed and the seeds removed. To 171 parts of the puree was added 0.34 part of a commercial pectin-destroying enzyme, and the mixture was vacuumized to promote penetration of the enzyme. After release of the vacuum the puree was kept at 100° F. for 5 hours. Then 175 parts of the deflavored honey product used in the foregoing example was added to give a mixture of 52.6 percent solids, which was evaporated to 83° Brix as described in Example I. After cooling to 90° F. the evaporated material was treated as described in the foregoing example. The procedure was repeated using 161 parts of the non-depectinized puree, an equal amount of deflavored honey products and seeding the evaporated material with 8.5 percent of starter. The evaporated material prior to crystallization was quite viscous and for this reason slightly more difficult to handle. After five days' crystallization both compositions had substantially the same consistency, with a characteristic, smooth non-sticky texture and excellent flavor and color.

*Example III*

Following essentially the procedure of Example I, 40 parts of grape concentrate of 73.2° Brix (corresponding to a concentration factor of 4.87 over the original grape juice) was combined with 195 parts of the deflavored buckwheat honey product, and the resulting mixture having a solids content equivalent to 78.7° Brix evaporated in vacuo to 83.5° Brix. It was then cooled slightly below 95° F. combined with 8 percent of the crystallized starter and 0.63 part of concentrated grape flavor obtained in the initial preparation of the grape juice concentrate. This grape flavor or "essence" was available at an effective concentration level of 63.5 times the original grape juice. The resulting product was well mixed and set to crystallize at a temperature of 58°±1.5° F. Examination after 5 days showed a product equal in quality to that obtained in Example I.

Analogous products were obtained by procedures similar to those described in the foregoing examples using various amounts of other fruits and fruit products, including strawberries, cherries, blackberries, peaches, pineapple juice, apricot juice, orange juice concentrate, and strawberry juice concentrate as well as other fruits and fruit products and mixtures thereof commonly utilized as constituents of jams, jellies, preserves and fruit butters.

I claim:

1. The process of producing a smooth-textured, non-gelled, fruit-sugar composition which comprises forming a mixture of a fruit component, containing an aqueous solution of fruit juice solids and at least a portion of the flavor constituents of the fruit juice, with a sugar component consisting essentially of invert sugars in a weight ratio of at least one part levulose to one part of dextrose, evaporating the mixture to a solids content of about 80–86 percent, initiating crystallization of the evaporated mixture by contacting it with crystalline dextrose hydrate and allowing crystallization to proceed at a temperature below 100° F.

2. A food product comprising a composition consisting essentially of a fluid mixture of honey solids and at least one fruit product of the group consisting of fruit juice, whole fruit puree and fruit juice concentrate, and having uniformly dispersed therein dextrose hydrate crystals in an amount sufficient to impart to the composition a nonfluid consistency at ordinary room temperature.

3. A fruit-sugar composition containing about 14–20 percent by weight of water and consisting essentially of a mixture of honey solids, with the constituents of at least one fruit product of the group consisting of fruit juice, fruit puree and fruit juice concentrate, said composition containing about 50–60 percent of honey solids, and having uniformly dispersed therein finely divided dextrose hydrate, in an amount sufficient to impart thereto a smooth textured nonfluid consistency.

4. The process which comprises forming a mixture containing about 14–20 percent by weight of water and about 50–60 percent of a sugar component consisting essentially of invert sugars in a weight ratio of at least one part levulose to one part of dextrose, with the constituents of at least one fruit product of the group consisting of fruit juice, fruit puree and fruit juice concentrate, adding fine dextrose hydrate crystals to the mixture at a temperature below 100° F., and thereafter maintaining it at a temperature below 100° F. for a length of time sufficient to cause crystallization of the mixture.

5. The process of claim 4 wherein the fruit product is a depectinized fruit product.

6. The process of claim 4 wherein the sugar component consists of honey solids.

7. The process of claim 4 wherein crystallization of the mixture is effected while maintaining it at a temperature of about 55°–60° F.

8. The process of producing a fruit-sugar composition which comprises mixing 50–60 parts by weight of a sugar component, consisting essentially of invert sugars in a weight ratio of at least one part levulose to one part dextrose, with at least one fruit component of the group consisting of whole fruit puree, fruit juice and fruit juice concentrate, to form a mixture having a fruit juice solids content at least equal to that of 40–50 parts of fruit puree and not substantially exceeding that present in 40–50 parts fruit juice; evaporating the resulting mixture under reduced pressure to a solids content of 80–86 percent; initiating crystallization of the evaporated mixture by addition of dextrose hydrate crystals at a temperature below 100° F., and allowing crystallization to proceed for a length of time sufficient to impart to the mixture a uniformly nonfluid consistency.

9. The process of claim 8 wherein the fruit component is a fruit juice concentrate.

10. The process of claim 8 wherein the sugar component is honey.

11. The process of claim 8 wherein the sugar component is invert sugar.

12. The process of claim 8 wherein the sugar component is a deflavored honey product.

13. The process of claim 8 wherein crystallization is initiated by addition of about 1 to 15 percent of finely crystallized sugar component.

14. The process of claim 8 wherein the crystallization of the evaporated mixture is effected at a temperature of about 55°–60° F.

15. A process comprising evaporating a mixture of grape juice and an invert sugar syrup, a major portion of the sugars content of which syrup consists of dextrose in admixture with at least an equal weight of fructose; concentrating the mixture by evaporation to a solids content of about 80–86 percent; cooling to 100° or below; seeding with a minor amount of a finely crystalline starter prepared by adding fine crystals of dextrose hydrate to the invert sugar syrup and allowing this mixture to crystallize; and permitting the seeded mixture to crystallize; forming a firm, smooth-textured, solid composition.

16. The process of claim 15 in which the invert sugar is honey solids.

17. Method of claim 8 in which the temperature of evaporation is maintained within the range of 60°–160° F.

JONATHAN W. WHITE, Jr.

REFERENCES CITED

The following references are of record in the file of this patent:

UNITED STATES PATENTS

| Number | Name | Date |
|---|---|---|
| 1,551,175 | Schneller | Aug. 25, 1925 |
| 1,854,430 | Statton | Apr. 19, 1932 |
| 1,933,367 | Cloud | Oct. 31, 1933 |

OTHER REFERENCES

"The Home Preparation of Fruit Candy" by Cruess et al., California Agricultural Extension Service, Circular 10, March 1927, revised May, 1938, The College of Agriculture, University of California, Berkeley, California, Pages 8 and 21–25.